United States Patent
Schröder

(10) Patent No.: US 7,086,071 B2
(45) Date of Patent: Aug. 1, 2006

(54) SPRING-SUSPENSION MAGNETICALLY STABILIZED PICK-UP ARM

(76) Inventor: Frank Schröder, Stuttgarter Platz 3, 10627 Berlin (DE)

( * ) Notice: Subject to any disclaimer, the term of this patent is extended or adjusted under 35 U.S.C. 154(b) by 0 days.

(21) Appl. No.: 10/478,884

(22) PCT Filed: May 21, 2002

(86) PCT No.: PCT/DE02/01911

§ 371 (c)(1),
(2), (4) Date: May 14, 2004

(87) PCT Pub. No.: WO02/095736

PCT Pub. Date: Nov. 28, 2002

(65) Prior Publication Data

US 2004/0196775 A1    Oct. 7, 2004

(30) Foreign Application Priority Data

May 21, 2001 (DE) .................. 101 24 776

(51) Int. Cl.
G11B 7/085    (2006.01)

(52) U.S. Cl. ............................................. 720/683

(58) Field of Classification Search ........... 720/683, 720/672; 369/255, 231, 247.1, 244.1, 246
See application file for complete search history.

(56) References Cited

U.S. PATENT DOCUMENTS

| | | | | |
|---|---|---|---|---|
| 3,924,076 A | * | 12/1975 | Dubois | 369/146 |
| 4,121,837 A | | 10/1978 | Tominari et al. | |
| 4,570,253 A | | 2/1986 | Firebaugh | |
| 4,995,025 A | * | 2/1991 | Schulze | 369/222 |
| 5,440,183 A | * | 8/1995 | Denne | 310/12 |

FOREIGN PATENT DOCUMENTS

| | | |
|---|---|---|
| DE | 2260855 | 6/1974 |
| DE | 3002013 | 7/1981 |

* cited by examiner

Primary Examiner—Allen Cao
(74) Attorney, Agent, or Firm—Cohen & Grigsby, P.C.

(57) ABSTRACT

The invention relates to a pick-up arm system for the reproduction or replay of records comprising a pick-up arm chassis and a pick-up arm tube. The torsion element suspension of the pick-up arm is axially stabilized by means of cylindrical permanent magnets which are arranged in a vertical direction and have opposite polarities, said elements forming a rotating bearing or a pivot. According to the invention, the torsion element runs in a congruent manner with respect to the vertical axis of rotation through the horizontal point of rotation of the receiving element for the tube of the pick-up arm. The lower part of the torsion element is connected to a permanent magnet which is connected to the receiving element for the pick-up arm or tube and the upper part of the torsion element is fixated attached to the upper chassis of the pick-up arm. A second permanent magnet or otherwise attached of opposite polarity is fixated in the lower chassis of the pick-up arm in a perpendicular position below said permanent magnet.

24 Claims, 3 Drawing Sheets

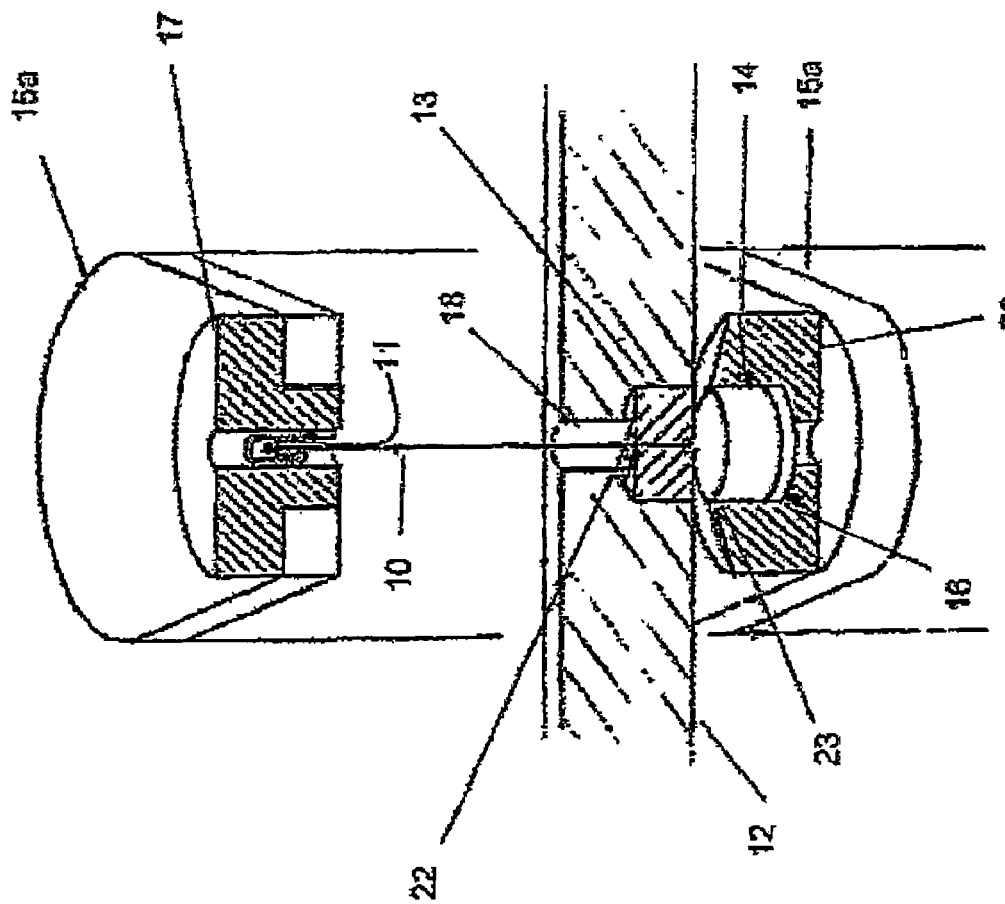

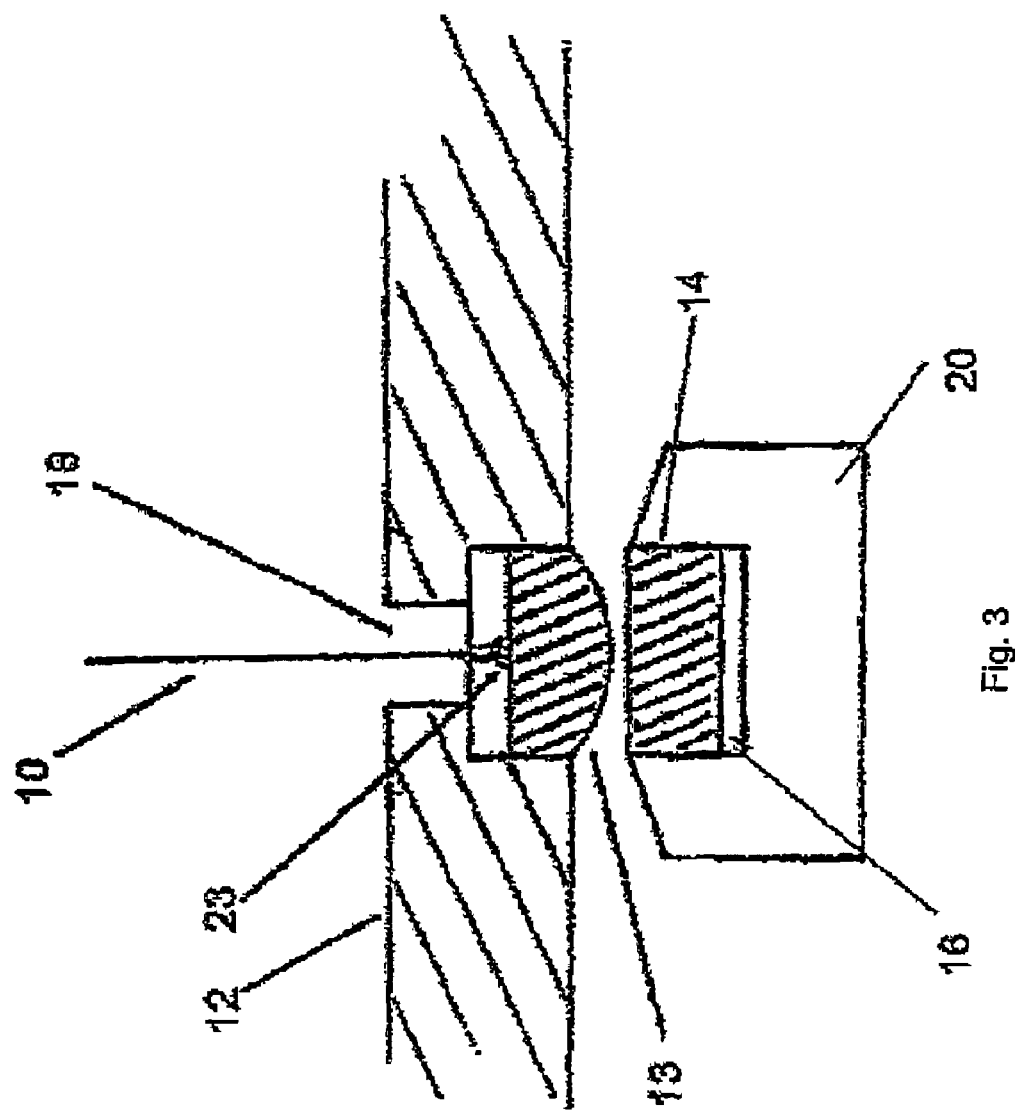

SPRING-SUSPENSION MAGNETICALLY STABILIZED PICK-UP ARM

FIELD OF THE INVENTION

The invention relates to a pick-up arm system for the reproduction or replay of records comprising a pick-up arm chassis and a pick-up arm tube, whereby a torsion element suspension of the pick-up arm tube is axially stabilized by means of cylindrical magnets of opposite polarity, forming a rotating bearing.

BACKGROUND OF THE INVENTION

For conventional pivoted pick-up arms the current state of technology mandates the use of knife edge-, ball-, ball and cone-, unipivot bearings or a combination of any of these. One of the drawbacks of these bearing principles is that the inherent friction and therefore disturbances of the pick-up arm movement can only be reduced to a system immanent minimum. The disturbances are the consequence of a continuous alternation between static friction and sliding/rolling friction("stick-slip" or "stiction" effect) while the pick-up arm is traversing the record forcing the cartridge to move in a jerky fashion, this being a detrimental influence on the fidelity of the cartridge's performance.

Additionally, the use of a bearing that rigidly couples the pick-up arm tube to the turntable (pick-up arm base, plinth, motor, platter) negatively affects the undisturbed tracking of the groove modulation. Disturbing parasitic resonances, i.e. excited by motor vibrations, air-or structureborne vibrations, are transmitted via the pick-up arm and it's armtube to the cartridge leading to an alteration aka distortion of the original signal. Likewise does the process of tracking the long-playing record ("LP")-groove by the cartridge excite resonances in the pick-up arm and the turntable it is mounted on.

The option to dampen the so-called "tonearm-cartridge resonance" (typically between 7 Hz and 14 Hz) by means of a silicon oil damping trough and pin/paddle featured by many pick-up arms negatively affects the reproduction of the upper frequency range of the music signal, overdamping.

Another drawback of conventional pivoted pick-up arms is their sensitivity to shock-induced damage. Commonly used bearing cups made out of precious or semi-precious stone are very brittle and crack or break easily. Their counterparts, bearing pins or cones—as much as conventional ball bearings almost inescapably suffer some damage after exposure to a strong shock or unsuitably rough handling. The damage manifests itself in flattened or bent bearing pin tips, flat spots on balls, indentations on their counterpart ballraces, these damages leading to increased and uneven friction, substantially reducing the fidelity of the pick-up arm.

DE 22 60 855 C2 describes a pick-up arm that uses repelling magnets to carry the axial load of the moving assembly. This arrangement results in reduced friction when moving the pick-up arm(tube) around it's vertical axis only.

U.S. Pat. No. 4,121,837 describes a turntable whose pick-up arm is damped axially by an electromagnetic damping arrangement. To achieve this, the arm features an electrically conducting sickle-shaped element that is attached to the pick-up arm near the (conventional=friction charged) horizontal bearing point. The electrically conducting sickle element travels horizontally through a magnetic field generated by two permanent magnets. Any movement of the sickle-shaped element relative to the magnets results in an induction of eddy currents in the sickle-shaped element, the resulting magnetic field surrounding said element leads to a repelling force in relation to the field generated by the two permanent magnets. The opposing magnetic field restricts and dampens the movement of the sickle-shaped element. The drawbacks of such an arrangement are: a) the sickle-shaped element increases the effective mass, b) the sickle-shaped element is prone to resonances, it is effectively a resonating tongue, and c) the arm "sees" no damping of vibrations in the vertical plane, stemming from i.e. warped records or footfall.

U.S. Pat. No. 4,570,253 describes a pick-up arm system where the arm tube is suspended by two threads via a disc-shaped element, predominantly in the vertical plane through a viscous fluid. The upper ends of the threads are attached to the pick-up arm base at two separate points near the pivot revolving point, the lower ends of the threads are attached to separate adjacent holes in the disc-shaped connecting element which rigidly holds the arm tube. This disc-shaped element is immersed in a cup filled with a viscous fluid. This arrangement is supposed to reduce the skating force that is a result of the friction of the "needle" travelling through the groove and the offset angle of the tonearm resulting in a force vector effectively pulling the arm towards the center of the record. It's disadvantage is that tilting motions and resonances along the pick-up arm's vertical axis are damped by the viscous fluid exclusively. Undesirable and inescapable shifts of the assembly's pivot while the arm is in operation are damped by the fluid only, the stabilizing effect defined by the viscosity of the fluid. Altering the damping characteristic is possible only through a time consuming exchange for another fluid of different viscosity.

The closest current state of technology is described by DE 30 02 013 C2. A thread (bearing) forms the equivalent of the vertical axis of a pick-up arm tube bearing housing that is stabilized by cylindrical permanent magnets of opposite polarity in the vertical direction attracting each other, allowing rotation solely in the horizontal plane, stabilizing the bearing housing axially only. The permanent magnets that are situated above the armtube, carrying the weight of the whole bearing housing, armtube and counterweight. The gap between the magnets is determined by the length of a thread under tension, located below the bearing housing/armtube assembly, connected to both the pick-up arm chassis and the bearing housing/armtube assembly. The permanent magnets are set in vertically oriented tubes, the upper of which is rigidly connected to the pick-up arm chassis. The arm tube is coupled to the bearing assembly via conventional, needle and cup-, ball- or knife edge bearings. The disadvantage of such arrangement lies in the fact that the pick-up arm still features a conventional pivot for the vertical movement of the armtube displaying a certain frictional resistance in operation. The arrangement predominantly aims at the compensation of the "skating effect". The permanent magnets in their tube shaped setting have a stabilizing function in the vertical axis only. Any vertical arm tube movement is neither stabilized nor damped.

Starting out from this state of technology it is the task/aim of the presented invention to provide a pick-up arm system that features extremely low, close to zero, friction and variable damping of arm movement in all three planes, combined with very low sensitivity to shock induced bearing damage.

The task is met by the characteristics/features of claim 1.

According to the invention, a torsion element, in this case a high tensile strength, non elastic thread (particularly a multifilament) is running congruent to the vertical axis of rotation and through the horizontal pivot inside the receiving element of the arm tube. The lower end of the torsion element is set into a permanent magnet which itself is set into the receiving element for the tonearm tube. The upper end of the torsion element is fixed to the upper extension of the pick-up arm chassis. Torsion element materials that can be used alternatively are: very thin steel wire or similar materials that combine high tensile strength and very low stretch.

A pick-up arm system, consisting of pick-up arm chassis, pick-up arm tube and suspension bearing is sometimes referred to as tonearm. In accordance with this invention, "tonearm" and "pick-up arm system" are to be regarded as the same.

In accordance with this invention, "tonearm tube" describes any type of pick-up arm-tube/stick/wand. According to the invention this means in particular not only a tonearm featuring a central longitudinal hole but also one that has a groove/longitudinal cutout rendering the longitudinal hole obsolete. Furthermore, according to this invention the term tonearm tube means a tonearm(tube) that has no hole and/or cutout at all, effectively a rod.

The upper permanent magnet, cylindrical in shape and extremely strong has a vertical extension that is less than the diameter of the tonearm tube receiving element, whereby the bottom of the permanent magnet is essentially flush with or does not extend beyond the bottom of the tonearm receiving element. The shape of the bottom side of the permanent magnet can be chosen freely, preferable are a planar, spherical segment or cylinder segment shape. To take up or fixate the torsion element, the magnet has a centerhole in which the torsion element is set without play/slack. Alternatively, the torsion element can be led through a centrally drilled pole piece made out of a high permeability material, whereby the thickness of the pole piece is chosen to provide enough room to fixate the torsion element, particularly for a countersunk hole to accept the knot. The permanent magnets consist of strongly magnetizing materials, particularly Neodym-Iron-Boron—or Samarium-Cobalt—alloys. Combining the two is feasible too.

Perpendicular underneath the permanent magnet in the pick-up arm receiving tube a second permanent magnet of opposite polarity is fixed to the lower extension of the pick-up arm chassis.

According to the invention, the torsion element facilitates three degrees of freedom(of movement). The pick-up arm receiving element and therefore the pick-up arm tube is suspended by a vertical thread which, to allow for rotation in the horizontal plane, needs to be slightly twisted only. When the arm is moved up and down, the thread is just being bent at the lower end(inside the pick-up arm tube receiving element) where it exits the magnet/pole piece. Rotation of the armwand around it's longitudinal axis is prevented since the center of gravity of the counterweight/pick-up arm tube/cartridge assembly is located below the vertical bearing (thread bending) point. This results in a steady condition in regard to the longitudinal axis of the pick-up arm tube.

While coupling the pick-up arm tube receiving element to the pick-up arm chassis without slack(or bearing play) the high inherent damping of the torsion element surpresses the excitement of mechanical resonances in the pick-up arm chassis by the cartridge. The length of the torsion element (between the upper fixing and the lower exit point) also ensures the suppression of footfall induced pick-up arm chassis vibrations relayed to the pick-up arm tube, meaning, parasitic vibrations are not added to the original signal(as encoded in the groove's modulation), maintaining it's fidelity.

The bearing friction is equal to the torsional friction of the torsion element, far lower(factor 10–1000) than the friction of bearing types used in conventional pick-up arm designs, i.e. unipivot-, knife edge- or ball bearings.

The movement of the pick-up arm tube in relation to all three degrees of freedom is damped through the induction of eddy current in the aluminum settings that hold the magnets (eddy current brake principle). Any change of the position of the pick-up arm tube results in an alteration of the flux line geometry of the magnetic field surrounding the two magnets. The strength of the eddy currents induced in the aluminum magnet settings is increasing proportionally to the velocity of the pick-up arm tube, independent of what is causing the movement/vibration, be it the cartridge or the turntable.

The permanent magnets in the pick-up arm tube and the pick-up arm chassis serve the function of stabilizers and dampers in all dimensions, including sideways, back and forth, or up and down. Additionally, the torsion element strongly inhibits the excitement/occurrence of pick-up arm tube resonances resulting from footfall or airborne resonances. Furthermore, the distance between the magnet in the pick-up arm wand and the perpendicular, pick-up arm chassis mounted counterpart is variable and facilitates the adjustment of the rigidity and the damping properties of this "quasi"-rigid bearing.

The torsion element runs through a vertical hole in the receiving element for the pick-up arm, the diameter of said hole chosen to give the torsion element enough freedom of movement to allow for the unimpaired tracking of even the most warped records, meaning the torsion element does not touch the upper rim of the hole while playing warped records. Connected to or sliding on to the rear end or stub of the pick-up arm receiving element is a counterweight, the center of gravity of which is located below the upper end of said hole.

This hole, effectively a well, can be filled with silicon oil. This yields the advantage of immersing the torsion element in silicon oil for approximately one third of it's length, additionally damping the transmission of vibrations stemming from the pick-up arm chassis via the torsion element to the pick-up arm tube. The dimensions of this "oil well" and the choice of silicon fluid of suitable viscosity exclude the possibility of overdamping the pick-up arm/cartridge resonance. Since the torsion element is running vertically through the "oil well", the silicon oil has a neglectable amount of damping in the horizontal plane regards to horizontal pick-up arm tube movement.

Optionally the pick-up arm receiving element and tube can be made out of a single piece of wood or a sandwich of several woods, the woods are characterized by high bending strength combined with high internal damping. Particularly suitable are ebony, jacaranda, acacia, cocobolo and bamboo, and many others are suitable too. The inner diameter or bore hole of the pick-up arm tube is chosen to be just large enough to take up the pick-up arm wiring, preventing microphony effects and the excitement of the enclosed column of air (pipe resonances).

Several advantageous features are described in the remaining sub-claims; the invention is being described using an executed sample and the following schematic drawings:

BRIEF DESCRIPTION OF THE DRAWINGS

FIG. 2 shows a sectional drawing of the pick-up arm receiving element and pick-up arm chassis.

FIG. 3 shows a sectional drawing of the pick-up arm receiving element with alternative suspension arrangement.

DESCRIPTION OF EXAMPLES OF THE INVENTION

Figure 1:
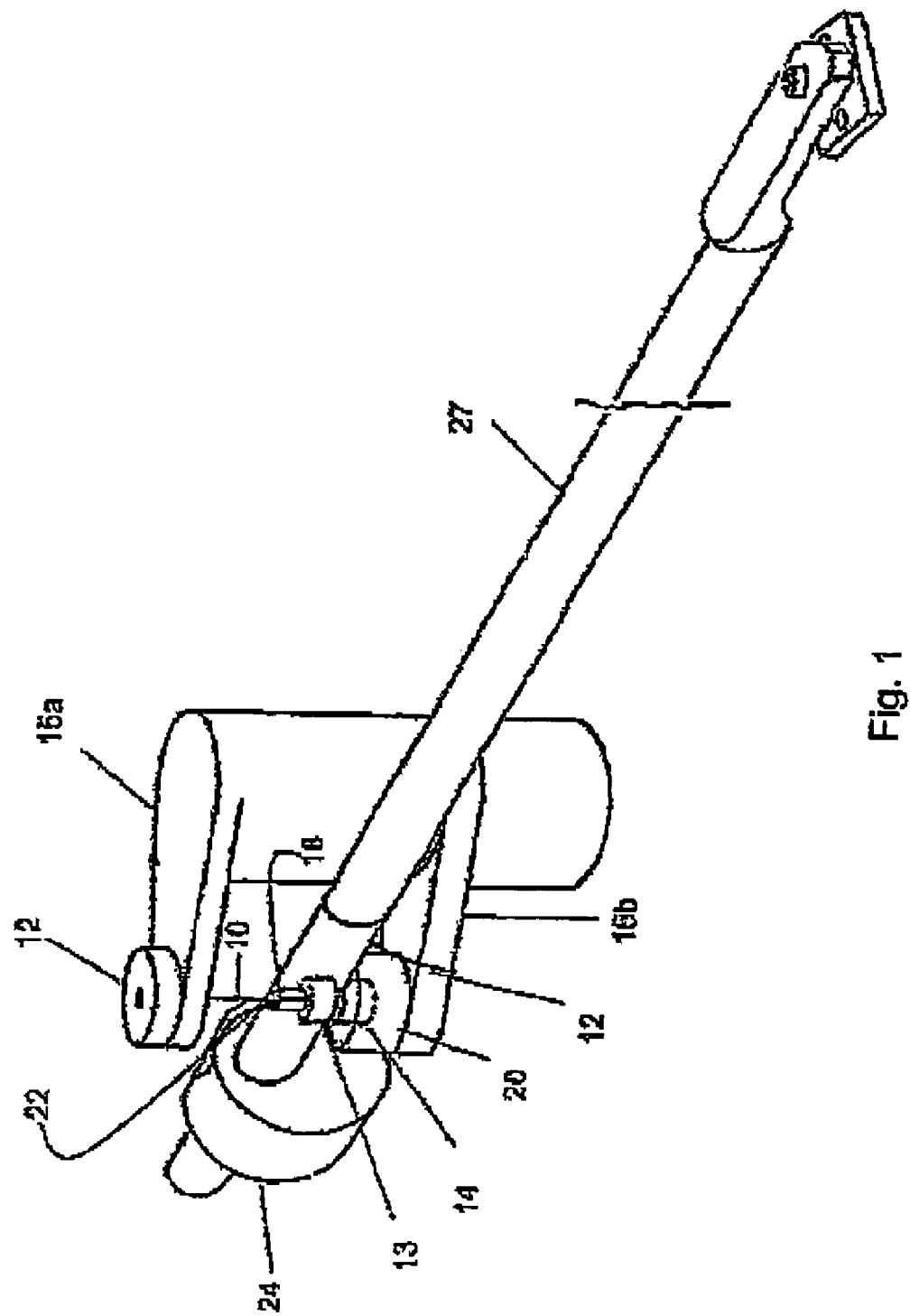
FIG. 1 provides a schematic depiction of the whole pick-up arm system.

FIG. 1 shows a schematic side view of the complete pick-up arm system. Along it's vertical axis of rotation the pick-up arm receiving element 12 having an arm wand or pick-up arm tube 21 press-fit into or otherwise held by it. The receiving element 12 features a (sack-, drill-) hole or bore 18 through which the torsion element 10 is running. Following axially is hole 22, running through the permanent magnet 13, said hole's 22 diameter equal to the diameter of the torsion element, therefore much smaller than the diameter of hole 18. The hole/bore 18 can be filled partially or entirely with silicon oil to dampen resonances within the torsion element. The diameter of hole 22 does not permit any leakage of silicon oil.

At it's lower end the torsion element 10 is centered, free of play/slack, by the lower, drilled(hole 22) permanent magnet, fixed/held by a knot 23, or glued in. A gap exists between the permanent magnet 13, set into the pick-up arm receiving element 12, and the permanent magnet 14, firmly attached to the lower extension of the pick-up arm chassis 15b. An alteration of the distance or width of the gap results in a change of flux line density in the magnetic field surrounding the permanent magnets and, accordingly, a change of the damping characteristics.

The lower permanent magnet 14 is held by/set into the aluminum setting 20, itself screwed to the lower extension of the pick-up arm chassis by means of a cylinder head screw 19(not shown here).

The receiving element 12 terminates in a rear stub portion onto which an eccentrically drilled counter weight 24 is adjustably fitted or slid onto.

FIG. 2 shows the suspension of the pick-up arm receiving element as much as the pick-up arm chassis along the pick-up arm tube. The upper end of the torsion element 10 is held by a centrally drilled grub screw 11, itself sitting in a tapped hole in the stepped disc 17. The stepped disc 17 is set—allowing play free rotation—into a hole in the upper extension of the pick-up arm chassis 15a.

A pole piece 16 made out of a high permeability material yields a magnetic shielding effects in relation to the area below the lower permanent magnet 14, while increasing flux line density in the gap between the two permanent magnets 13 and 14. Flux line density can be increased further by "potting" the lower permanent magnet 14. The permanent magnet then needs to be centered perfectly, otherwise any asymmetry of the flux line distribution around this "bearing" will result in variations of the vertical tracking force (VTF)—as "seen" by the cartridge—along/across the usable radius of the record.

FIG. 3, a sectional drawing, depicts an alternative form of the suspension. Along it's vertical axis of rotation the pick-up arm receiving element 12 features a (sack-, drill-) hole or bore 18 through which the torsion element 10 is running. Below or terminating the bore 18 is a polepiece 16. Preferably, this is a centrally drilled polepiece 16a, this polepiece sitting right on top of the permanent magnet 13. The bottom side of the polepiece features a countersink/bore, large enough to take up a knot to fixate the torsion element 10, also allowing for a glued connection. This form of suspension renders a hole in the permanent magnet 13 obsolete. Furthermore, FIG. 3 depicts an alternative shape of the bottom part of permanent magnet 13. Contrary to the magnet's flat bottom as shown in FIG. 1 and 2, FIG. 3 shows permanent magnet 13 with a spherical segment shaped bottom.

While the foregoing has been set forth in considerable detail, it is to be understood that the drawings and detailed embodiments are presented for elucidation and not limitation. Design variations may be made but are within the principles of the invention. Those skilled in the art will realize that such changes or modifications of the invention or combinations of elements, variations, equivalents or improvements therein are still within the scope of the invention as defined in the appended claims.

The invention claimed is:

1. A pick-up arm system for the replay of long-playing records comprising a pick-up arm chassis, having an upper and lower extension, and a pick-up arm tube, having a receiving element moveably suspended from said chassis by a pivotable torsion element, said receiving element being stabilized by first and second cylindrical magnets of opposing polarity, wherein said torsion element is substantially congruent to the vertical axis of rotation of said receiving element, one end of said torsion element positioned by said first magnet, said first magnet being set into said receiving element, the opposing end of said torsion element being attached to said upper extension of said chassis; and said second magnet being attached to said lower extension of said chassis perpendicular to said first magnet.

2. A pick-up arm system as set forth in claim 1, wherein said, torsion element comprises a high tensile strength, non elastic thread.

3. A pick-up arm system as set forth in claim 1, wherein said torsion element comprises a steel wire, a carbon fiber rod or a material of minimal stretch.

4. A pick-up arm system as set forth in claim 1, permanent wherein said first magnet has a smaller extension than the diameter of said pick-up arm receiving element.

5. A pick-up arm system as set forth in claim 4, wherein the bottom of said first magnet is substantially flush with the bottom of said receiving element.

6. A pick-up arm system as set forth in claim 4, wherein the bottom of said first magnet comprises a planar, spherical segment- or cylinder segment shape.

7. A pick-up arm system as set forth in claim 1, wherein said torsion element extends through a central vertical bore in said receiving element, thereby allowing ample room for vertical movement of said torsion element without said receiving element interfering with said torsion element.

8. A pick-up arm system as set forth in claim 7, wherein said vertical bore is partially or entirely filled with oil.

9. A pick-up arm system as set forth claim 1 wherein said torsion element is substantially fixated by an axial guiding hole in said first magnet.

10. A pick-up arm system as set forth in claim 9, wherein said guiding hole (22) being has a diameter smaller than the diameter of said vertical bore.

11. A pick-up arm system as set forth in claim 1 wherein said torsion element is attached to a centrally drilled pole piece said pole piece having a countersink chosen to provide enough room for fixating said torsion element in said pole piece by means of a knot.

12. A pick-up arm system as set forth in claim 1, wherein said torsion element is fixated or held by a knot, cotter pin or an adhesive.

13. A pick-up arm system as set forth in claim 1, wherein said first and second magnets stabilize said arm tube axially, radially and vertically.

14. A pick-up arm system as set forth in claim 1, wherein the fluxline density between said first magnet and said second magnet is adjustable.

15. A pick-up arm system as set forth in claim 1, wherein said second magnet has a non-magnetic electrically conductive material housing.

16. A pick-up arm system as set forth in claim 1, wherein said arm tube is connected to an eccentrically bored counterweight, said counterweight having a center of gravity located below the upper opening of said axial guiding hole.

17. A pick-up arm system as set forth in claim 1, wherein said receiving element is made out of an non-magnetic, electrically conductive material.

18. A pick-up arm system as set forth in claim 1, wherein said arm tube is made out of wood said wood having a high bending strength and high internal damping of vibrations.

19. A pick-up arm system as set forth in claim 1, wherein said arm tube and said receiving element comprise of a single piece of wood.

20. A pick-up arm system as set forth in claim 18 wherein said wood consists of ebony, jacaranda, acacia, bamboo or another suitable wood.

21. A pick-up arm system as set forth in claim 1, wherein said first and second magnets consist of strong magnetic materials or alloys.

22. A pick-up arm system as set forth in claim 21, wherein said strong magnetic materials are Neodymium-Iron-Boron, Samarium-Cobalt or a combination thereof.

23. A pick-up arm system as set forth in claim 11, wherein said pole piece consists of a material having high permeability.

24. A pick-up arm system as set forth in claim 19, wherein said arm tube and headshell are made out of a single piece of wood.

* * * * *

UNITED STATES PATENT AND TRADEMARK OFFICE
CERTIFICATE OF CORRECTION

| | |
|---|---|
| PATENT NO. | : 7,086,071 B2 |
| APPLICATION NO. | : 10/478884 |
| DATED | : August 1, 2006 |
| INVENTOR(S) | : Frank Schroder |

It is certified that error appears in the above-identified patent and that said Letters Patent is hereby corrected as shown below:

On the title page, Column 1, Line 1, the title should read --STRING-SUSPENSION MAGNETICALLY STABILIZED PICK-UP ARM--

Signed and Sealed this

Tenth Day of October, 2006

JON W. DUDAS
*Director of the United States Patent and Trademark Office*